United States Patent
Dorman

[11] Patent Number: 5,287,971
[45] Date of Patent: Feb. 22, 1994

[54] RACK FOR SUPPORTING LOADED PLASTIC GROCERY BAGS

[76] Inventor: Isidore Dorman, 147-71 6th Ave., Whitestone, N.Y. 11357

[21] Appl. No.: 904,014

[22] Filed: Jun. 25, 1992

[51] Int. Cl.[5] .............................................. B42F 17/00
[52] U.S. Cl. ..................................... 211/12; 211/200; 224/311; 224/42.42
[58] Field of Search .................. 211/195, 200; 248/95, 248/97; 224/309, 311, 42.42, 273; 24/30.5 R

[56] References Cited

U.S. PATENT DOCUMENTS

| | | | |
|---|---|---|---|
| 942,231 | 12/1909 | Woodman | 248/100 |
| 1,018,637 | 2/1912 | Shults | 211/12 |
| 1,286,940 | 12/1918 | Cerny | 248/95 |
| 3,033,379 | 5/1962 | Clark | 211/200 |
| 3,994,425 | 11/1976 | Graber | 224/273 |
| 4,540,213 | 9/1985 | Herlitz et al. | 224/311 |
| 4,723,741 | 2/1988 | Doering | 248/97 |

Primary Examiner—Paula A. Bradley
Assistant Examiner—Chuck Y. Mah
Attorney, Agent, or Firm—Michael Ebert

[57] ABSTRACT

A rack that may readily be installed in the trunk or cargo compartment of a vehicle, the rack including at least one raised horizontal bar from which one can suspend in a row several loaded plastic-film grocery bags so that the bags then rest on the floor of the trunk or cargo compartment in an upright position with their mouths closed. The plastic film bag has an open mouth and is provided with a pair of upwardly-extending handle loops integral with the opposing sides of the bag. The raised bar has a series of hooks anchored thereon at spaced positions, each hook being formed of a resilient spring wire having a U-shaped bend therein that defines a dilatable clamp. When the loaded grocery bag is carried in one hand by a shopper by its handle loops, the loops then bunch together to form a tail. This tail is pushed into the dilatable clamp of a hook on the bar.

11 Claims, 3 Drawing Sheets

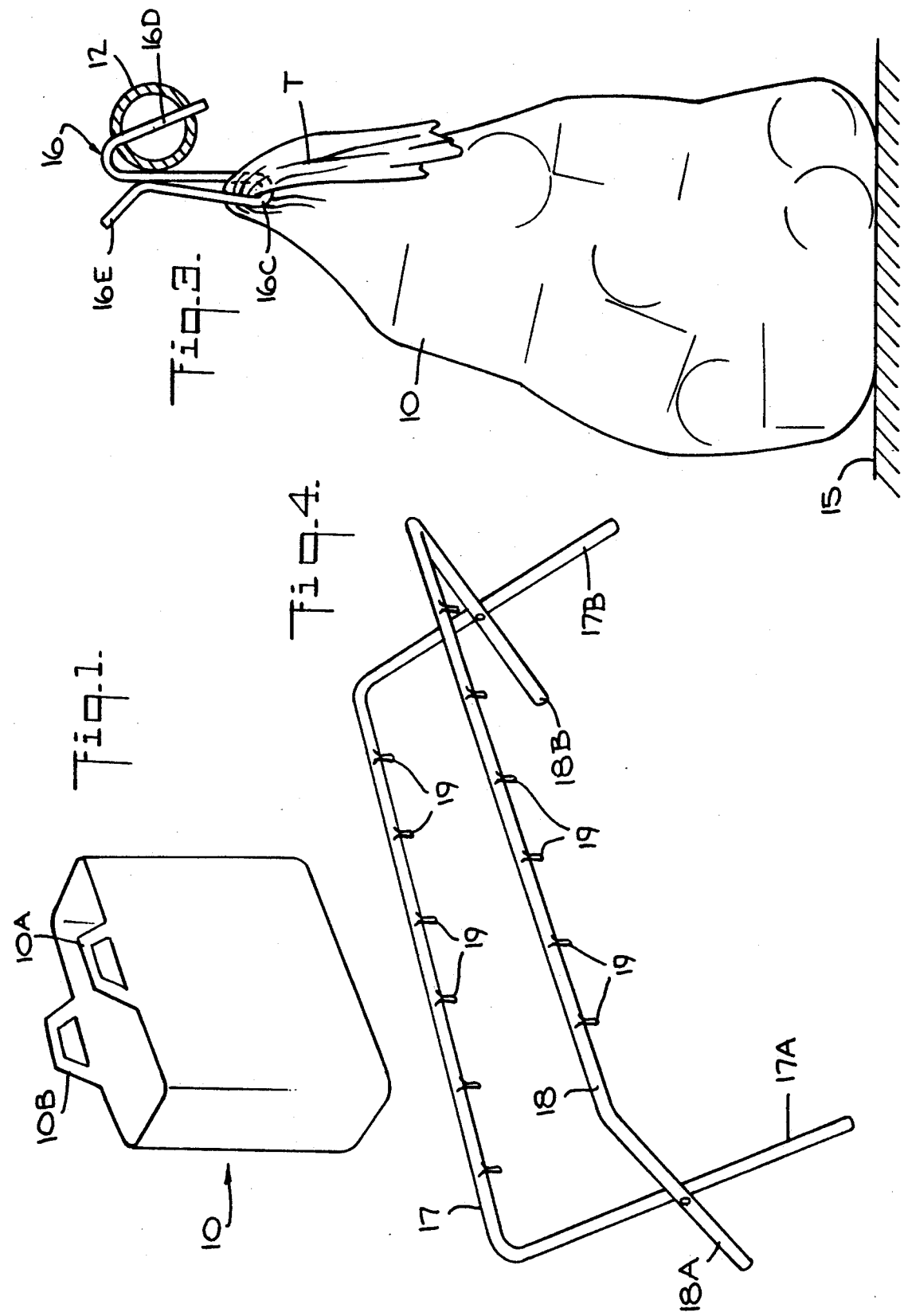

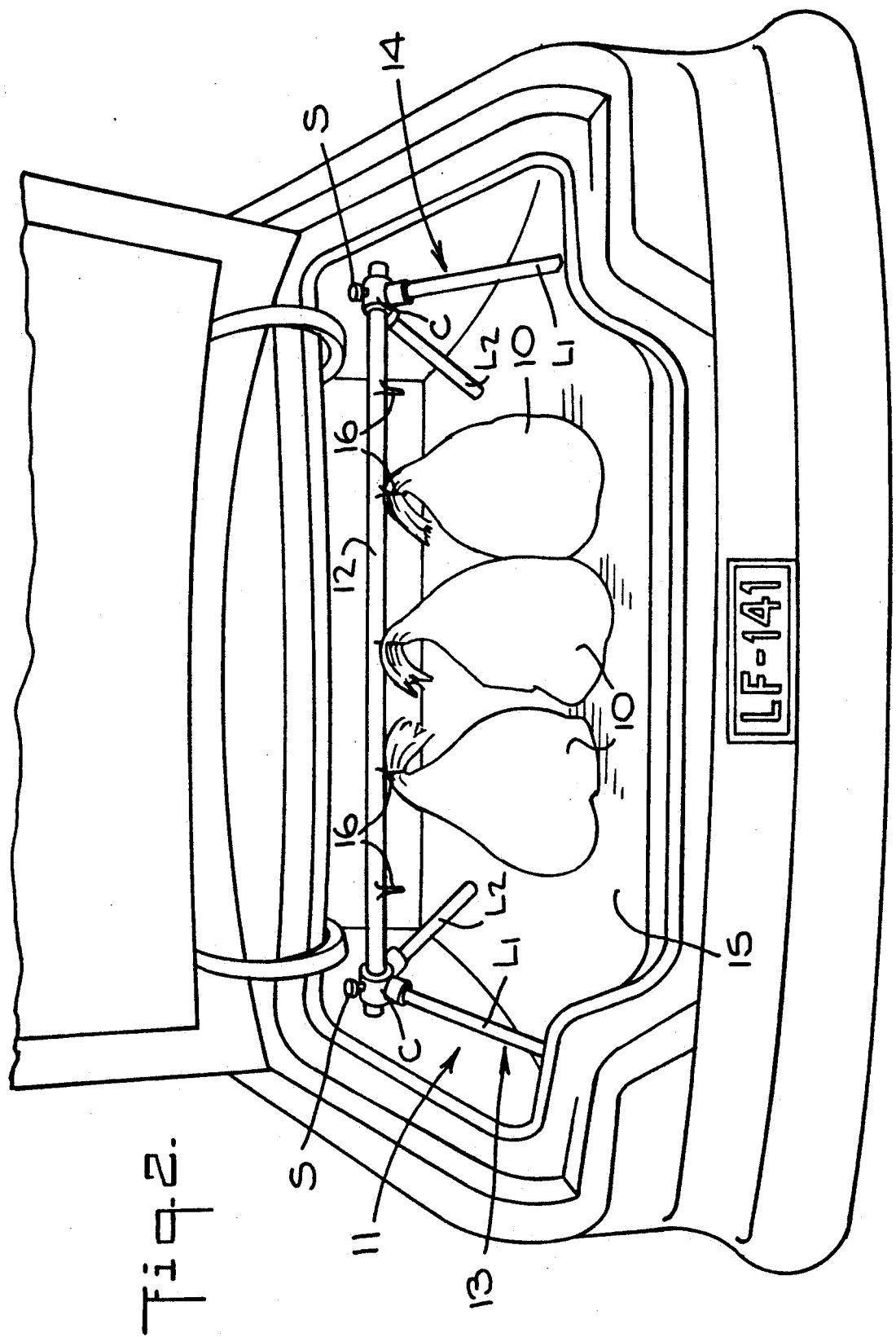

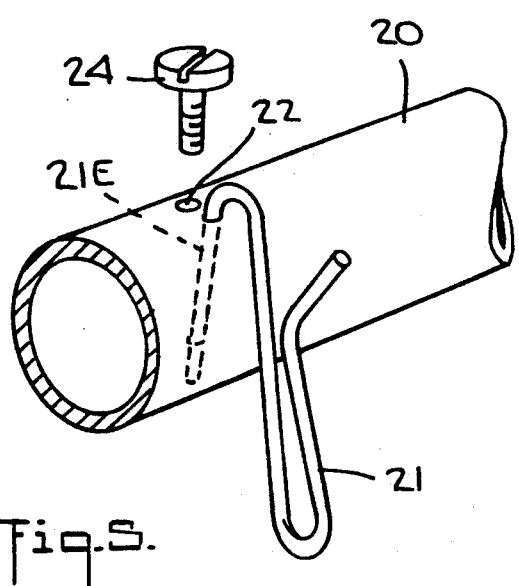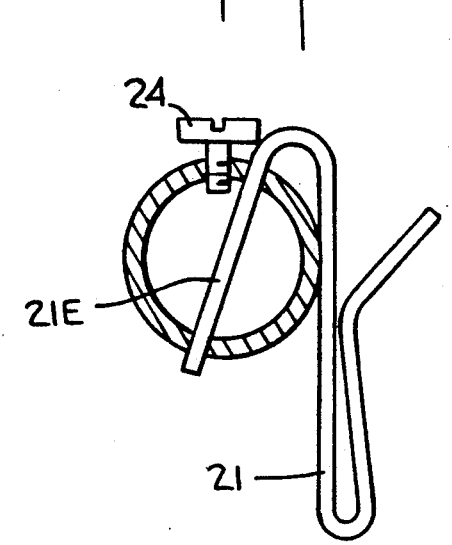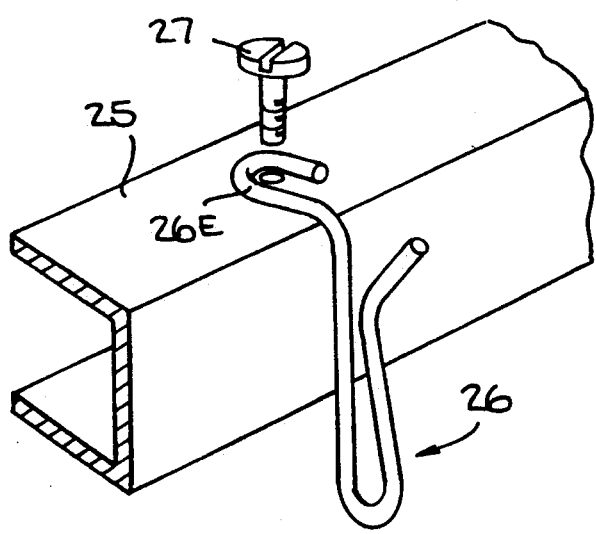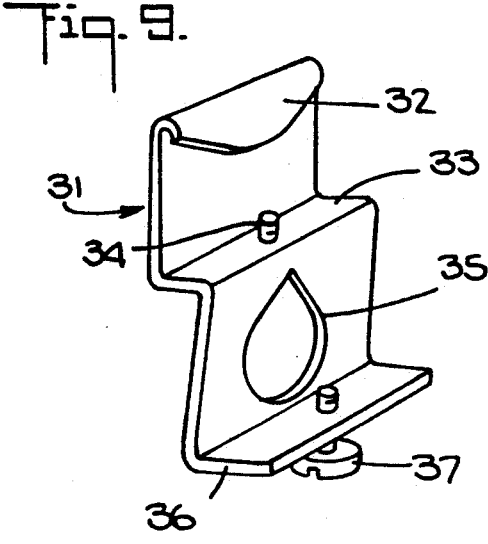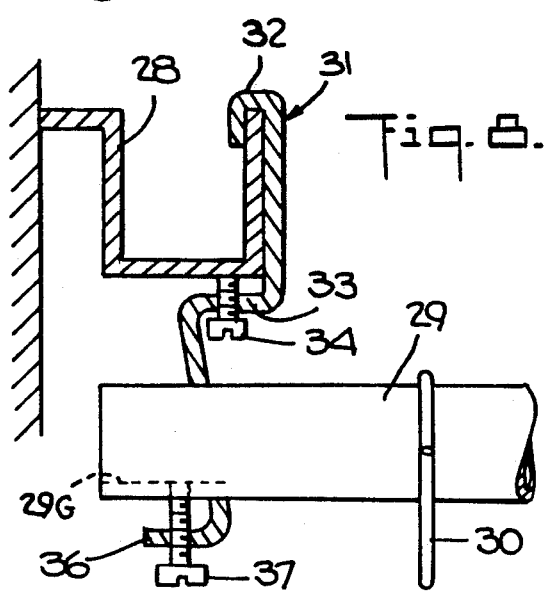

RACK FOR SUPPORTING LOADED PLASTIC GROCERY BAGS

BACKGROUND OF INVENTION

1. Field of Invention

This invention relates generally to racks for supporting grocery bags in an upright position, and more particularly to a rack which readily fits into the trunk or cargo compartment of an automobile or station wagon and is adapted to suspend loaded plastic-film grocery bags from a horizontal bar so that the mouths of the bags are then closed and the bags are all maintained in an upright position on the floor of the compartment.

2. Status of Prior Art

The conventional grocery bag now in general use in supermarkets is formed of plastic-film material having an open mouth and provided with a pair of upwardly extending handle loops integral with opposing sides of the bag. The patent to Jenkins, U.S. Pat. No. 4,723,743, discloses a rack to facilitate loading of a bag of this type at a supermarket checkout counter. The Jenkins rack has a rectangular frame to receive the bag, the upper rails of the frame including U-shaped elements that are engaged by the loops of the bag to maintain the bag in an open state while being loaded with groceries.

The concern of the present invention is with what happens to this plastic-film grocery bag after it is loaded in a supermarket. As pointed out in the Wolfe U.S. Pat. No. 4,372,512, bags full of groceries are typically placed in the trunk of an automobile or into the cargo space at the back of a station wagon. These loaded grocery bags receive little lateral support; hence even mild cornering or stop and go driving can often cause a loaded grocery bag to overturn, especially where there are no canned goods or other relatively heavy articles at the bottom of the bag to stabilize the bag in the trunk or in the cargo space of a station wagon.

Should a loaded grocery bag overturn, the shopper must then, when arriving home, retrieve and rebag the spilled contents scattered over the floor of the trunk or cargo space of a station wagon. And should the articles spilling out of the bag be fragile or breakable, then the shopper may be faced with cleaning up a wasteful and unsightly mess. Wolfe's solution to this problem is to provide an elaborate, foldable framework including various upright support members and latch means therefor.

The same problem is addressed by Dottor et al. in U.S. Pat. No. 4,226,348. This patent points out that when loaded grocery bags are placed anywhere in an automobile, then sudden stoppages, fast accelerations and quick turns can frequently wreak havoc among the bags. According to Dottor et al., the modern automobile in this age of shopping malls and supermarkets serve two primary functions; the first, of course, being to transport passengers; the second to transport groceries.

But though automobile manufacturers include in their vehicles devices to receive the spare tire and bumper jack in the trunk compartment and also provide seat belts and shoulder straps to secure the driver and the passengers, no attention is paid to securing bagged groceries being transported in these vehicles. To this end, Dottor et al. provides a foldable unit which is installable in the trunk of a vehicle, and which when erected creates an array of compartments, each adapted to accommodate a loaded grocery bag and to maintain it in an upright position. However, the Dottor et al. arrangement is complex and relatively expensive.

The Herlitz et al. U.S. Pat. No. 4,540,213 provides skid slats in the rear cargo compartment of a station wagon which can in a cargo-support mode then act to support packages in an upright manner during operation of the vehicle.

The Majewski U.S. Pat. No. 4,189,056 discloses a portable rack sized to fit into the trunk of a car, the rack having several partitions for minimizing the movement of articles placed therein when being transported from a point of purchase to the home of the shopper.

While the above-noted prior art patents seek to maintain grocery bags in an upright position, they do not take into account the differences between strong paper grocery bags made of kraft paper and the type of plastic film bag that in most supermarkets has replaced paper bags. Paper bags are relatively stiff, and when loaded with groceries, these bags will maintain their form. But plastic film bags have little rigidity and are therefore collapsible. Such bags, when loaded, are difficult to maintain in an upright position unless they are suspended by their handle loops.

SUMMARY OF INVENTION

In view of the foregoing, the main object of this invention is to provide a simple and effective rack for supporting loaded plastic-film grocery bags in the trunk or cargo compartment of a vehicle, so as to prevent the contents of these bags from spilling out regardless of how the vehicle is driven when transporting the groceries from the supermarket where they are purchased to the shopper's residence or other site.

More particularly, an object of this invention is to provide a low-cost rack including at least one raised horizontal bar having a series of hooks anchored thereon to support the plastic-film grocery bags in a row, the rack arrangement being such that virtually all of the available floor space in the trunk or cargo compartment of the vehicle may be occupied by the grocery bags, thereby fully utilizing the available space.

Also an object of this invention is to provide a rack of the above type which can readily be dismantled, so that when the rack is not in use it may be stored in the trunk or cargo compartment of the vehicle in a flat state and therefore not interfere with the storage of other articles in the compartment.

A significant advantage of a rack in accordance with the invention is that it acts to suspend a loaded film shopping bag from a hook anchored on a raised horizontal bar, and in this suspended condition the mouth of the bag is closed and the bag is suspended by its handle loops which are then bunched into a tail clamped by the hook to afford a secure, high-strength suspension.

Briefly stated, these objects are attained in a rack that may readily be installed in the trunk or cargo compartment of a vehicle. The rack includes at least one raised horizontal bar from which one can suspend in a row several loaded plastic-film grocery bags so that the bags then rest on the floor of the trunk or cargo compartment in an upright position with their mouths closed. The plastic film bag has an open mouth and is provided with a pair of upwardly-extending handle loops integral with opposing sides of the bag. The raised bar has a series of hooks anchored thereon at spaced positions, each hook being formed of a resilient spring wire having a U-shaped bend therein that defines a dilatable clamp. When the loaded grocery bag is carried in one hand by a shopper by its handle loops, the loops then bunch together to form a tail. This tail is pushed into the dilatable clamp of a hook on the bar.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a typical plastic-film grocery bag;

FIG. 2 shows a preferred embodiment of a single bar rack in accordance with the invention from which a row of loaded plastic-film shopping bags may be suspended and thereby maintained upright on the floor of the trunk or cargo compartment of a vehicle;

FIG. 3 shows the relationship between one of the bag hooks on the rack bar and the grocery bag suspended therefrom;

FIG. 4 shows, in perspective, a two-bar rack in accordance with the invention;

FIG. 5 shows a hook anchored on a cylindrical bar before it is locked in place;

FIG. 6 shows the anchored hook locked in place;

FIG. 7 shows a hook anchored on a channel-shaped bar;

FIG. 8 illustrates a preferred embodiment of a rack which has brackets to support a bar on the rain gutters of a trunk compartment; and FIG. 9 separately shows one of the brackets.

DESCRIPTION OF INVENTION

Self-Supporting Racks

Referring now to FIG. 1, there is illustrated a typical plastic-film grocery bag 10 fabricated of this synthetic plastic-film material of high strength, such as biaxially-oriented polyethylene or polypropylene. Bag 10 includes a pair of upwardly-extending handle loops 10A and 10B integral with opposing sides of the bag.

When the two like handle loops are grasped by one hand of the shopper, the loops then bunch together to form a handle. And as explained later, they also create a tail.

FIG. 2 shows one preferred embodiment of a single bar rack in accordance with the invention for suspending a row of loaded plastic-film grocery bags 10 in the trunk or cargo compartment 11 of a vehicle so that the bags rest on the floor 15 of the compartment in an upright position. The rack, which is dimensioned to fit into the compartment and to extend almost its full width, includes a horizontal cylindrical bar 12 formed of steel tubing or other suitable metallic or non-metallic material.

Bar 12 is supported at an elevated position above floor 15 of the compartment by means of a pair of identical horses 13 and 14, each having a coupling collar C to which is welded or otherwise attached at an angle thereto legs $L_1$ and $L_2$. The inner diameter of the coupling collar matches the outer diameter of cylindrical bar 12 so that each end of this bar may be telescoped within a collar and locked thereto by a set screw S received in a threaded bore in the collar. Hence it is a simple matter to erect the rack or to dismantle it when the rack is to be stored in a flat state in the compartment.

Anchored on bar 12 at equi-spaced positions thereon is a series of clamping hooks 16. As shown separately in FIG. 3, each hook 16 is formed by a short length of spring metal wire having spring characteristics. The wire is bent to define a U-shaped dilatable clamp 16C whose rear tine is extended and bent to form a crook 16D which fits into diametrically-opposed bores in tubular rod 12. The crook is provided with a notch which snaps into the lower bore in rod 12 so that the crook is retained in the rod. The front tine is extended and bent out to form an extension 16E to define an entry guide into the clamp.

It is a simple matter to attach a bag 10 to a hook 16 on the bar or to withdraw the bag therefrom. When the shopper holds handle loops 10A and 10B of the bag in one hand, the handles then bunch together to close the mouth of the bag, the bunched handle loops forming a tail T. All the shopper need do to secure the bag to a hook 16 is to push the tail T of the bag into the dilatable clamp 16C so that it is clenched thereby to firmly grip the tail. And when the shopper wishes to unload the bags from the trunk, he has only to pull the tail T of the bag out of the entry guide of the dilatable clamp of the hook.

In the two-bar rack arrangement shown in FIG. 4, two identical bars 17 and 18 are provided, each having right-angle leg extensions 17A-17B and 18A-18B of the same length at opposite ends of the bar. The legs of the two bars are pivoted together in an X-formation so that when the rack is installed in a trunk, the two bars are in parallel relation. Each bar is provided with a series of equi-spaced hooks 19 as in FIG. 2. The advantage of the two-bar arrangement is that it supports two rows of loaded grocery bags in the trunk, one behind the other. This arrangement is suitable for a vehicle trunk which is deep and commodious and therefore has room for a large number of loaded bags or for a van or station wagon.

As shown in FIG. 5, in order to positively lock a hook 21 to a raised tubular rack bar 20 having diametrically-opposed bores therein to receive the crook portion 21 of suspension hook 21, adjacent these bores is a third hole 22 for receiving a sheet metal screw 24 whose shank engages crook portion 21E, and, as shown in FIG. 6, whose head clamps the hook.

The invention is not limited to racks having cylindrical pipe bars; for, as shown in FIG. 7, bar 25 on which a hook 26 is anchored has a channel-shaped cross section. The hook in this case has a lug 26E which is engaged by a sheet metal screw 27 inserted in a hole in the bar.

Gutter Supported Rack

In FIGS. 2 and 4, the racks illustrated therein are provided with legs at either end which rest on the floor of a trunk or cargo compartment of a vehicle and support above the floor a horizontal bar provided with bag suspension hooks.

The gutter-supported rack illustrated in FIGS. 8 and 9 requires no legs and lends itself to installation in the trunk of vehicle provided on either side with a rain gutter 28.

In this gutter-supported rack, use is made of a tubular metal bar 29 having a series of bag-clamping elements 30 installed thereon similar to those included in the racks previously described. The bar is supported at either end by a bracket 31 that hooks onto the wall of gutter 28.

Bracket 31 is formed by a generally rectangular metal plate which is bent to define an upper right angle section and a lower right angle section which merges with the upper section. The upper vertical wall of the upper right angle section is folded into create a hook 32 that slips onto the outer wall of the gutter 28.

The horizontal ledge 33 of the upper right angle section has a threaded bore therein which receives a clamping screw 34 that is turned in to engage the bottom of the gutter and thereby lock the bracket to the gutter.

A port 35 formed in the vertical wall of the lower right angle section receives the end of tubular rod 29. The horizontal ledge 36 of the lower right angle section has a threaded bore therein to receive a clamping screw 37 which engages rod 29 to lock it in place. Rod 29 is provided, as shown in FIG. 8, with an indented groove 29G which receives the tip of screw 37 to prevent rotation of the bar.

This gutter-supported rack is easily installed or removed. The two brackets 31 may be permanently attached to the rain gutters on either side of the trunk by clamping screws 34. To then mount rod 29, its left end is slid into the port of the left bracket far enough in to clear the right side gutter bracket. The right end of the bar is then slid into the port of the right side gutter bracket and the bar centered, after which the clamping screws for the bar are turned in and tightened to hold the bar in place. When it becomes necessary to remove the bar, one simply loosens the clamping screws, the bar then being withdrawn first from one bracket and then from the other.

While there have been shown and described preferred embodiments of a rack for supporting plastic grocery bags in accordance with the invention, it will be appreciated that many changes and modifications may be made therein without, however, departing from the essential spirit thereof.

I claim:

1. A rack for suspending loaded plastic-film grocery bags so that they rest on the floor of a trunk or cargo compartment in a vehicle and are maintained in an upright position, each bag having an open mouth and a pair of handle loops extending upwardly from opposite sides of the bag, the loops when held together in a hand of a shopper then bunching together to form a tail closing the mouth, said rack comprising:

(a) at least one horizontal bar having a series of suspension hooks anchored thereon, each hook being formed by a resilient spring wire that is bent to define a dilatable clamp whose configuration is such that when the tail is pushed into the clamp, the clamp then dilates to clench the tail and the bag is suspended therefrom, said bar being a pipe having at each hook position bores to receive a crook extension of the hook clamp; and (b) means to support the bar at an elevated position at which the bags rest on the floor and are maintained in an upright position.

2. A rack as set forth in claim 1, wherein said bar is a cylindrical pipe, and said means to support the bar are constituted by two horses, each having a coupling collar into which is telescoped one end of the bar, and a pair of legs at an angle to each other attached to the collar.

3. A rack as set forth in claim 1, having two horizontal bars, each bar having a right angle extension at either end to form bar legs, the bar legs of the two bars being pivoted together in an X-formation to support the bars at an elevated position.

4. A rack as set forth in claim 1, wherein said bar is formed of steel tubing.

5. A rack as set forth in claim 1, further including a sheet metal screw that is received in a hole in said bar to engage said crook extension to lock the hook in place.

6. A rack as set forth in claim 1, wherein said bar has a channel-shaped cross section.

7. A rack as set forth in claim 1, wherein said supporting means is constituted by a pair of brackets which receive the ends of the bar and hook onto the outer wall of rain gutters on either side of said trunk.

8. A rack as set forth in claim 7, wherein each of said brackets is formed by a metal plate that is bent to define an upper section whose upper end is folded in to form a hook that hooks onto the outer wall of the related gutter, and a lower section having a port to receive the related end of the bar.

9. A rack as set forth in claim 8, wherein the upper section of the bracket is provided with a clamping screw to engage the gutter and the lower section with a second clamping screw to engage the rod.

10. A rack as set forth in claim 9, wherein said rod is tubular and is provided with an indented longitudinal groove to receive the tip of the second clamping screw to prevent rotation of the rod.

11. A rack as set forth in claim 1 wherein said wire is bent into a U-shaped form having arms which converge to create an inlet for the tail.

* * * * *